Aug. 1, 1939.   M. L. CORNELL ET AL   2,167,875
FLEXIBLE GRILLE
Filed July 14, 1936   3 Sheets-Sheet 2
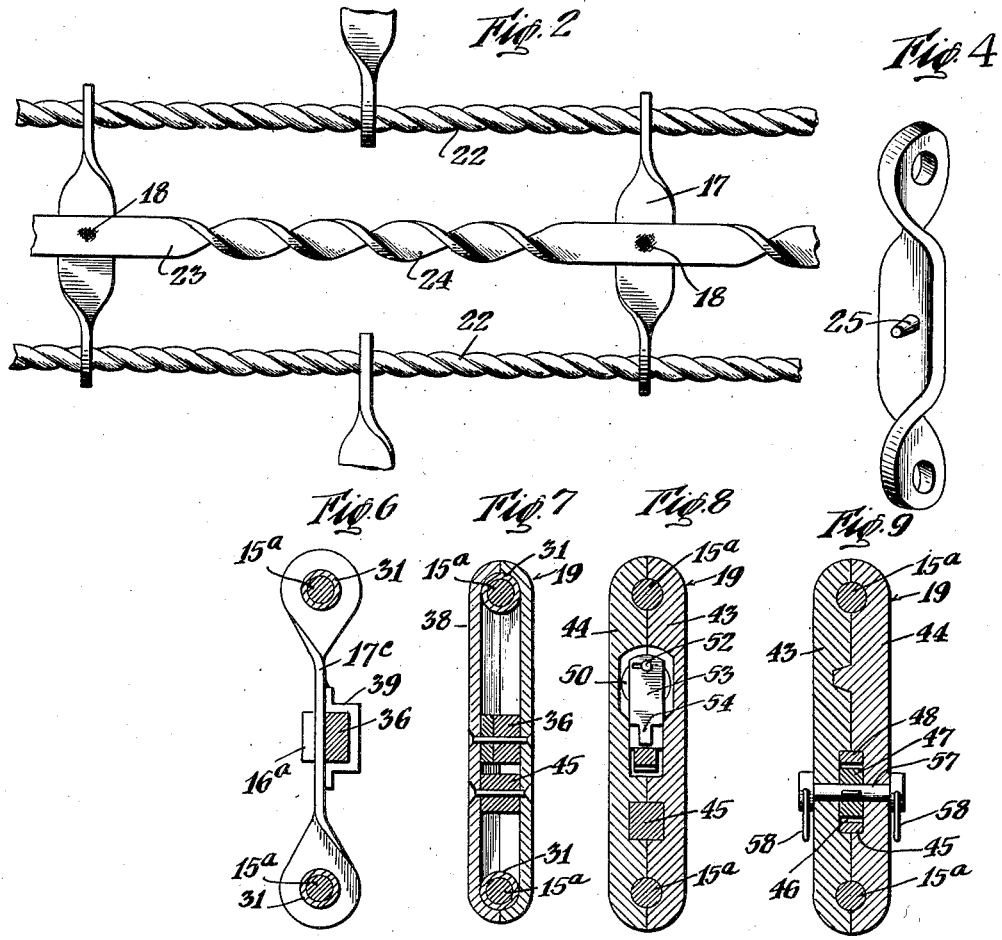
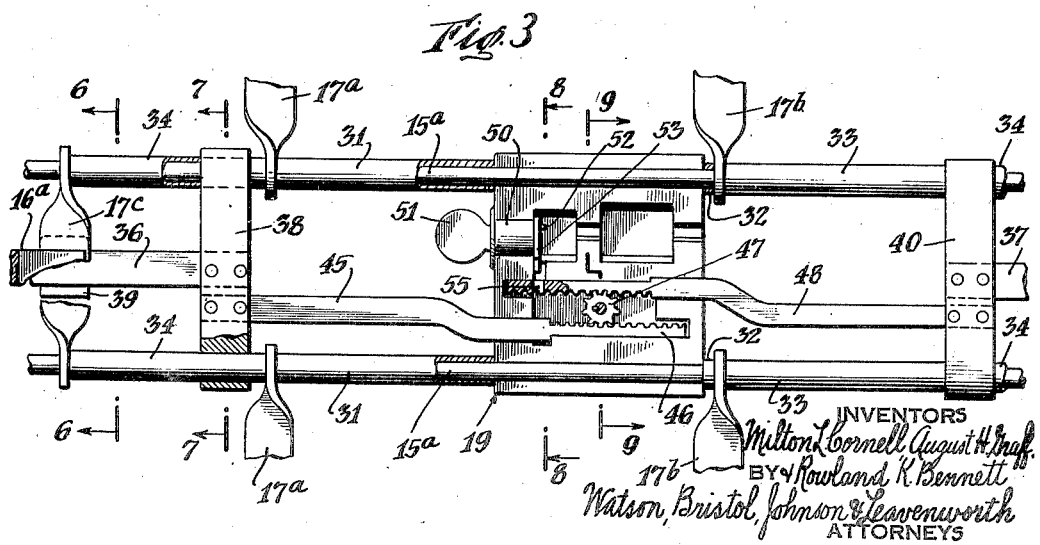

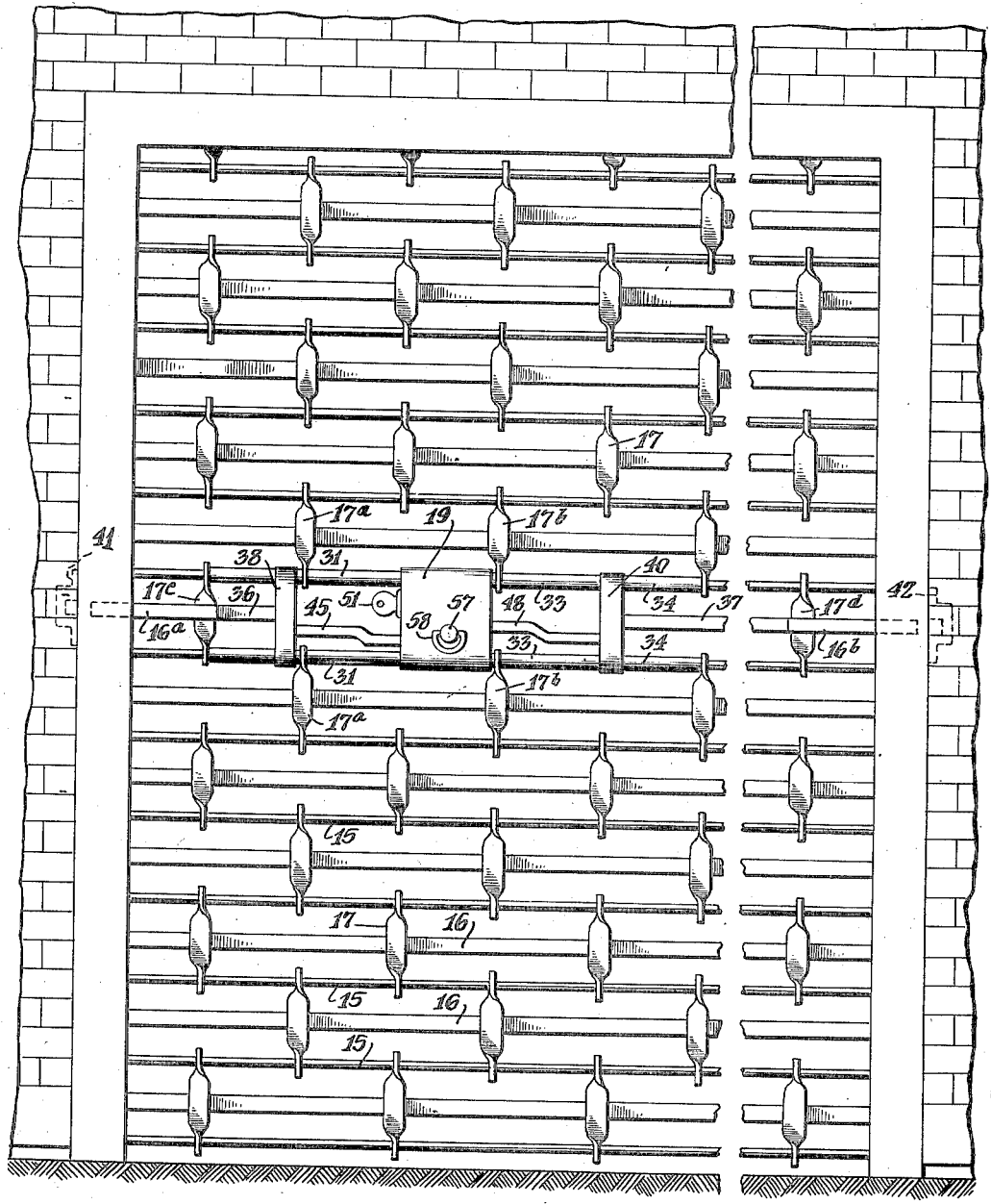

Aug. 1, 1939.    M. L. CORNELL ET AL    2,167,875
FLEXIBLE GRILLE
Filed July 14, 1936    3 Sheets-Sheet 3
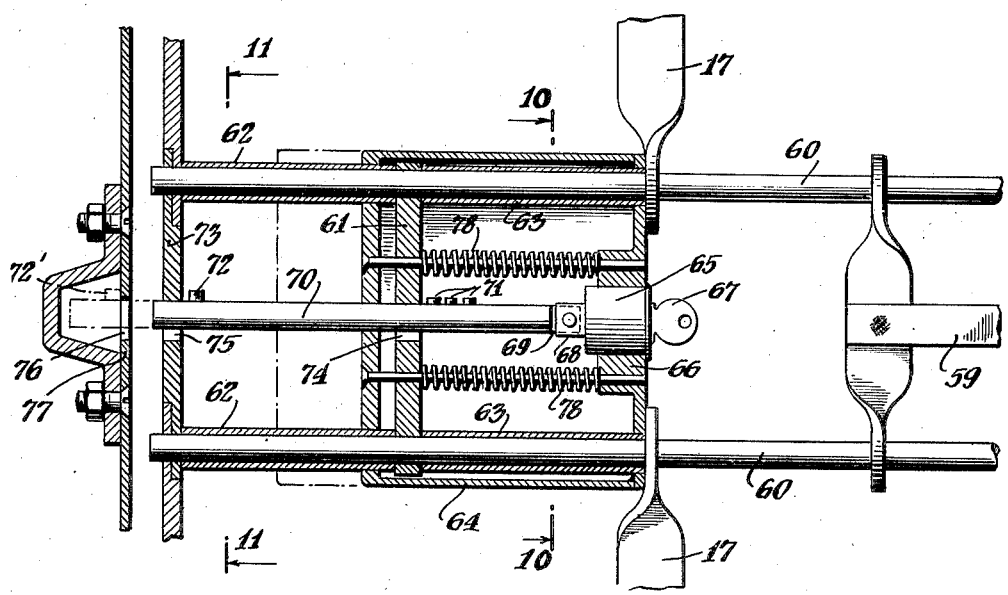
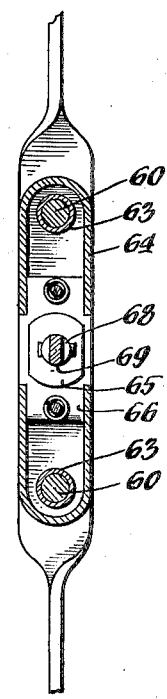
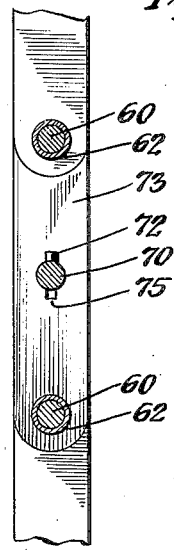
INVENTORS
Milton L. Cornell, August H. Graff,
Rowland K. Bennett
BY
Watson, Bristol, Johnson & Leavenworth
ATTORNEYS Patented Aug. 1, 1939

2,167,875

UNITED STATES PATENT OFFICE 2,167,875

FLEXIBLE GRILLE

Milton L. Cornell, August H. Graff, and Rowland K. Bennett, New York, N. Y., assignors to Cornell Iron Works, Inc., Long Island City, N. Y., a corporation of New York Application July 14, 1936, Serial No. 90,480

5 Claims. (Cl. 189—56)

The invention is concerned with grilles of the flexible open-work type adapted to be readily retracted through such means as by coiling on an overhead roller. Such grille constructions must be capable of free, easy flexing, but possessed of considerable strength and rigidity when adjusting into their extended closing position. The simultaneous achievement of such characteristics is rendered particularly difficult by reason of the added requirement that the grille must be relatively light in weight and capable of being repeatedly coiled and uncoiled, which latter characteristic is dependent, for the most part, upon the elements being maintained in absolute alignment.

Attempts to produce a grille which will satisfy these various conditions have led in many cases to the use of a great many individual parts, resulting in an undesirable amount of weight, and particularly in an excessive number of detailed operations in manufacture and assembly, with the accompanying high cost.

It is an object of this invention to produce a grille of rigid construction, but of a much simplified form, light in weight and capable of being readily and economically manufactured and assembled. A primary feature of the construction and method of assembly contributing to these ends comprises the provision of a vertical supporting and spacing means including a horizontal rod and vertical links rigidly and permanently secured thereon, these parts comprising essentially a prefabricated unit. In accordance with a preferred form, the vertical links are provided with perforations at their opposite ends adapted to have threaded therethrough intermediate horizontal rods which serve as hinge bearings for the successive units. The rods to which the vertical links are initially secured perform the additional function in the complete assembly of a normal transverse rod lending their rigidity and strength to the grille in substantially the same fashion as the hinge bearing rods.

The arrangement is such as to enable the ready incorporation therein of an effective lock mechanism which likewise is of simple construction and which does not mar the general appearance of the grille nor interfere with the rapid and economical method of assembling. In accordance with the particular arrangement, the lock mechanism may be mounted in a simple casing adapted, in assembling, to be slid easily into place over the main grille bars and spanning the space between two of such bars. The lock bolt or bolts extending to the edge of the grille in such case may conveniently be mounted in bearings on the vertical links, the whole forming a strong rigid construction difficult to destroy or tamper with, yet free from any interference with the folding of the grille.

The lock mechanism presents other unusual and advantageous features. Prominent among these is the provision of a lock which may be readily operated from either side of the grille and which nevertheless is of the barrel type, having a single entrance key hole, difficult to operate without the intended individual key, the single key hole being arranged to extend in the plane of the grille. The type of housing and the mounting therefor, noted above, enable such a comparatively safe type of lock to be employed, and conveniently located for ready accessibility and manipulation of the key from either the front or back of the grille.

The lock mechanism in its more refined forms and adaptations includes other features, such as a type of lock bolt mechanism, which is especially resistant to any attempts to displace the bolt, as by inserting a bar and prying the bolt and grille away from the side supports. In accordance with the specific arrangement of this idea the lock bolt is made rotatable and at its outer projecting end has a part which in rotated position, after being outwardly projected, is interlocked with the bracket in the side guides of the grille and is relatively inaccessible and difficult to displace without release through means of the key.

The invention accordingly comprises the features of construction, combination of elements, and arrangements of parts together with the several steps and the relation of one or more of such steps with respect to each of the others, all as exemplified in the following detailed disclosure, and the scope of the application of which will be indicated in the claims:

Fig. 1 is a general view depicting a grille embodying the invention positioned in a wall opening;

Fig. 2 is a fragmentary view showing a somewhat modified form of structural members;

Fig. 3 is a fragmentary view of the lock mechanism shown in Fig. 1 with the casing of the lock and certain parts broken away to show details of the mechanism employed;

Fig. 4 is a slightly modified link showing one of the different ways of securing it to the horizontal bar;

Fig. 5 shows a modified form of lock mechanism in which the lock bolt interengages in rotated position with a bracket of the guideway;

Figs. 6, 7, 8 and 9 are sectional views taken on the lines 6—6, 7—7, 8—8 and 9—9 respectively of Fig. 3; and Figs. 10 and 11 are cross-sectional views taken on the lines 10—10 and 11—11, respectively, of Fig. 5.

In Fig. 1 there is disclosed a grille embodying features of this invention, the grille being located in a typical environment and being adapted to be upwardly moved to a retracted position in any manner suitable to the purpose, as by coiling it on an overhead roller. The edges of the grille are retained in and slide in suitable guideways. The transverse rods may be of different types in cross section, and straight in extent or contoured, but as specifically illustrated in Fig. 1, the grille comprises alternate straight round bars 15 and flat bars 16, to which latter are secured the elongated supporting and spacing links 17. The bar 16 and the corresponding links 17 constitute, in reality, a unit which may be preassembled. The respective links 17 when in normal operative position lie in a vertical plane and are formed with perforated ends adapted to receive the bars 15, and the grille in rolling, for example, will fold into sections hinging about the bars 15.

The construction thus far described may be readily and economically manufactured and assembled, and such preliminary operations constitute steps in the method forming an important feature of this invention. In accordance therewith the spacing links 17 are secured intermediate their ends on the bar 16 by any suitable means, spot welding being one particularly economical and rapid means of so assembling them, such a spot welding being shown generally at 18 in Fig. 2. After the spacing units have been prefabricated as described, they may be readily assembled by threading the rods 15 through the perforated ends of two adjacent units. With the spacing links rigidly and permanently secured to the supporting bar in the manner here illustrated it will be noted that the grille will be relatively free of play and noise in operation; further, that such construction presents exceptional difficulties in the way of anyone attempting to break through the grille. For example, each link 17 is secured to the bar 16 by means independent of the others, and cutting or releasing of one link will not loosen any of the remaining ones. It is to be understood that by the terms rigid and permanent, as employed above and in the claims, there is meant a joint which is positive in character as distinguished from a mere interlocking or frictional engagement.

The above method of fabricating a grille permits the ready incorporation therein of a lock mechanism of the type disclosed generally at 19 in Fig. 1. It will be seen that the lock constitutes in substance a special one of these units, the details of which are disclosed in Fig. 3 to be described more fully hereinafter.

It will be understood that the ends of the rods which travel in the side guides will be secured together by suitable end link mechanism, a construction well adapted for this purpose being shown in the patent to M. L. Cornell No. 2,027,153 granted January 7, 1936. This patent likewise shows a guide means for the edge of the grille suitable for the present construction. The bars 16 may be suitably secured in end links of the nature shown in the above patent or, if preferred, may merely abut against such end links.

In Fig. 2 there is shown a modified form of construction which may be employed in place of that shown in Fig. 1, and in which the laterally extending members are of a twisted character. The rods 22 comprise bars originally of square cross-section twisted into the form shown; and the spacer members may have alternate flat and twisted sections 23 and 24 respectively. The twisting of the bars 22 gives them exceptional stiffness and strength. Likewise the spacer members are given added stiffness at the intermediate twisted areas 24 which are furthest from the supporting vertical links and subjected to the greatest bending forces. The whole provides a very stiff strong construction and one which in addition is particularly attractive in appearance.

Contributing to the economy and simplicity of the construction of the grille is the shape and manner of forming the vertical links which may be stamped out with the ends at right angles to the intermediate flat portion, or may be merely flat members with the ends twisted into a 90 degree plane from the middle portion substantially about the axis of symmetry of the links. One especially economical manner of assembling these spacing links to the spacer bar is by spot welding as heretofore described, but other means may be provided for this purpose, such as by riveting, and if desired the link may be provided with a projection 25, as shown in Fig. 4, adapted to engage in holes in the spacer bar. It will be seen with respect to the various specific forms of links and spacer bars described above that the operation of making these spacer units comprising the bars and links is relatively simple and inexpensive and may be performed, for example, on automatic machinery.

As heretofore stated, one of these spacer units may have incorporated therein a lock mechanism such as shown generally in Fig. 1 and in detail in the Figs. 3 and 6 to 9 inclusive. The lock mechanism includes the casing 19 mounted directly on and spanning the space between two adjacent rods 15a. The lock casing may be positively secured in position against transverse movement by means of suitable sleeves 31 extending on the left into abutting engagement with the vertical links 17a. If found desirable additional spacer sleeves 32 may be located on the right side of the lock housing abutting against the spacing links 17b.

Sections of the normal vertical supporting and spacing means are located in the areas between the particular bars 15a not occupied by the lock mechanism, these sections being of a length respectively dependent upon the particular location of the lock housing which normally would be in the center of the grille. Accordingly, in Figs. 1 and 3 there is shown a section at the left of the lock comprising a spacing link 17c, having secured thereto a spacer bar section 16a and extending therefrom to the left edge of the grille; and at the right a section comprising one or more spacing links 17d having a spacer bar section 16b secured thereto and extending to the right edge of the grille. Additional spacer sleeves such as those shown at 33 and 34 threaded over the rods 15a cooperate with the associated spacing links, spacer sleeves 31 and 32 and the lock casing 19, to provide continuous abutting surfaces to maintain the lock and associated parts in position against transverse movement along the rods 15a.

Locking of the grille is accomplished through oppositely projecting lock bolts 36 and 37 respectively. The lock bolt 36 projecting to the left is secured to a slidable member 38 in the nature of a cross-head, the sleeves 34 forming guides therefor. The bolt 36 is additionally slidably supported in a loop 39 (see Fig. 6) secured to the spacing link 17c. The lock bolt 37 is correspondingly secured to a cross-head 40 slidable on the sleeves 33, and the bolt is further guided and supported in loops secured to the one or more spacing links 17d in a manner similar to that provided for the lock bar 36 just described. In their outermost positions the lock bolts 36 and 37 engage in a recess in brackets 41 and 42 respectively, fixed in the outer stationary guides.

The more detailed parts of the lock mechanism are shown in Figs. 3, 7, 8 and 9, and as there disclosed the casing may comprise the two halves 43 and 44 suitably secured together. Projecting to the left from this casing is a connecting rod 45 secured to the cross-head 38 and being provided at its inner end with a rack 46 adapted to mesh with the gear 47. A corresponding connecting rod 48 extends from the cross-head 40 and has a rack engaging with the gear 47 in opposed relation to the rack 46. Mounted within the lock casing is the lock 50, this lock being of the more tamper-proof type, commonly referred to as a barrel type and in accordance with conventional constructions provided with tumblers. The key is shown at 51, the manipulation of which rotates the cylinder, in which case the eccentric pin 52 serves to slide the latch 53 vertically in suitable guides in the lock casing halves 43 and 44. In Fig. 5 the lock bolts 36 and 37 are shown inwardly withdrawn to their unlocking position. If desired the lock bolts may be positively secured in such position by manipulation of the key 51 causing the tongue 54 to project into the opening 55. This has the advantage of insuring that the lock bolts will not be accidentally or casually shifted to an outer position and damaged in movement of the grille. When in the locked position, with the lock bolts engaging into the recesses provided by the brackets 41 and 42, the bar 48 will have been moved to the right a sufficient distance to permit the tongue 54 to engage behind the rear end of the bar 48 and lock bolts 36 and 37 thereby positively restrained against release. Movement of the lock bolts 36 and 37 may be accomplished when released by the lock 50 by grasping either one of the cross-heads 38 or 40, or, if preferred, manually operable means may be connected directly to the gear 47, comprising a shaft 57 provided with rings 58 on the opposite sides of the lock casing. The lock mechanism above described is of a particularly safe and effective construction, well adapted to fit in with the construction of the grille, in general, and method of assembly, and has the particular advantage of being readily accessible to the key from either the front or rear side of the grille, and likewise the lock bolts may be readily shifted from the front or rear.

In Figs. 5, 10 and 11 there is shown a form of lock mechanism which likewise may be readily operable from either the front or the rear of the grille and which is particularly effective against release, except through use of the key. In this construction the bar 59 carrying the vertical links located between the rods 60 has a portion omitted at the end to accommodate the lock mechanism, which includes a plate 61 mounted on the rod 60, fixed against lateral movement by the spacer sleeves 62 and 63. A casing 64 incloses the plate 61 and has apertures to receive the sleeves 62 and 63 upon which the casing is slidable. The lock is carried by the casing 64 and comprises a cylinder 65 mounted in the boss 66 of the right end plate of the casing 64. The lock may be similar in character to that of Fig. 3 and in general is of the cylinder and tumbler type, having a single key opening adapted to receive the key 67. In accordance with common lock means of this nature, the key 67 is operable to release and rotate the inner cylinder which carries a pair of spaced ears 68 adapted to receive and have pinned therebetween the tongue 69 of the rotary lock bolt 70.

In the position shown the lock bolt is restrained against outward movement, other than by manipulation of the key, through means of the pins or projections 71 adapted to engage behind the plate 61, and likewise the pin 72 occupying a position to the right of the end link 73. To lock the grille, the key 67 is turned, which rotates the lock bolt 70 swinging the pins 71 into the lowermost position in which they are in line with the slot 74 of the plate 61, and likewise the pin 72 assumes a position in line with the notch 75 of the end link 73. In this rotated position, pressure on the key or casing 64 will serve to slide the casing and the lock bolt to the left, to the position shown in the dotted line. In this operation the pin 72 also passes through the notch 76 of the fixed guide plate 77. After the bolt and casing have been moved to the left as noted above, the key and lock bolt 70 are again rotated and the pin 72 will then occupy the position 72' shown in dotted lines in Fig. 5, in which position the key may be withdrawn. The pins 71 will likewise occupy a position to the left of the fixed plate 61 with the pins rotated 180 degrees from the notches 74. Springs 78 normally urge the casing 64 and the lock bolt 70 to the right into the position shown, and restrain the lock bolt from being shifted to the left except when such movement is deliberately intended. It will be seen that the lock bolt can be displaced from its locking position only by rotation thereof. The lock mechanism disclosed is exceptionally secure, and insures against the release of the lock bolt through the prying action of a tool inserted between the grille and guide and thereby springing the grille as a whole sufficiently to free the lock bolt.

Since certain changes may be made in the specific constructions set forth, and likewise changes in the steps of the method as specifically described without departing from the scope of the invention, it is intended that all matter contained in the above description or shown in the accompanying drawings shall be interpreted as illustrative and not in a limiting sense.

Having described our invention what we claim as new and desire to secure by Letters Patent is:

1. A flexible grille comprising a series of laterally extending main grille bars; a laterally extending spacer bar intermediate a pair of said main bars having a transverse link secured thereto, said link having its opposite ends hingedly connected to the adjacent main bars respectively; a lock means spanning and mounted upon said pair of main bars; and a lock bolt laterally extending from said lock means and having a sliding support on said link; and means for operating said lock bolt from said lock means.

2. A flexible grille comprising a series of laterally extending main grille members, and alternate spacer link supporting members; and a plurality of elongated spacer links of flat bar stock rigidly disposed transversely and secured flatwise at their middle portion to said alternate supporting members and laterally spaced therealong, having their opposite ends twisted by a turn through ninety degrees about the axis of symmetry into a plane at right angles to the middle portion and provided with perforations in said ends, the oppositely extending links from two adjacent link supporting members having the intervening grille member threaded through their perforated ends to form hinges and provide an articulated grille structure.

3. A flexible grille comprising a series of laterally extending grille members, said members being alternately of flat bar stock and of round stock; and a plurality of elongated spacer links of flat bar stock disposed transversely and laterally spaced along said flat bar members, said links at their middle portion and the corresponding flat bar member being rigidly secured together flatwise in the normal plane of the grille, and the opposite ends of said links being twisted by a turn through ninety degrees about the axis of symmetry into a plane at right angles to said normal plane, the oppositely extending links from two adjacent flat bar members having the intervening round member hingedly attached to said twisted ends thereby providing a flexible grille structure.

4. A flexible grille comprising a series of laterally extending main grille members; and vertical supporting and spacing means between adjacent pairs of said members, said means comprising a single laterally extending flat bar and a plurality of elongated links of flat bar stock located in spaced relation along and disposed transversely of said bar and rigidly welded thereto intermediate the ends of said links, the opposite ends of each of said links being twisted by a turn through ninety degrees about the axis of symmetry into a plane at right angles to said intermediate portion and to the normal plane of the grille, and said ends being provided with perforations through which are threaded in a hinge-like manner the corresponding adjacent main grille members.

5. A flexible grille comprising a series of laterally extending main grille members; and interposed supporting and spacing means for articulating adjacent pairs of said members, said means each comprising a single laterally extending main bar having a relatively plane supporting surface and a plurality of elongated links of flat bar stock located in spaced relation along and disposed transversely of said main bar and attached to said surface intermediate the ends of the links, each of said links being arranged with the flat surface of its middle portion resting on the supporting surface of the main bar and adapted to lie in the normal plane of the grille and provided with permanent securing means for rigidly fastening the same in such position, each of the opposite ends of said links being twisted by a single turn of ninety degrees about the axis of symmetry into a plane at right angles to said intermediate portion and to the normal plane of the grille and said ends being provided with perforations through which are threaded in a hinge-like manner the corresponding adjacent main grille members.

MILTON L. CORNELL.
AUGUST H. GRAFF.
ROWLAND K. BENNETT.